United States Patent
Shepelev et al.

(10) Patent No.: US 10,061,428 B2
(45) Date of Patent: Aug. 28, 2018

(54) DETECTING APPLIED FORCES ON A DISPLAY

(71) Applicant: SYNAPTICS INCORPORATED, San Jose, CA (US)

(72) Inventors: Petr Shepelev, Campbell, CA (US); Byunghwee Park, Daegu (KR)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/199,307

(22) Filed: Jun. 30, 2016

(65) Prior Publication Data

US 2018/0004336 A1  Jan. 4, 2018

(51) Int. Cl.
    *G06F 3/041* (2006.01)
    *G06F 3/044* (2006.01)
    *G02F 1/1333* (2006.01)
    *G02F 1/1368* (2006.01)
    *G02F 1/1335* (2006.01)

(52) U.S. Cl.
    CPC .......... *G06F 3/0416* (2013.01); *G02F 1/1368* (2013.01); *G02F 1/13338* (2013.01); *G02F 1/133514* (2013.01); *G06F 3/044* (2013.01); *G06F 3/0412* (2013.01); *G06F 3/0414* (2013.01); *G02F 2202/28* (2013.01); *G06F 2203/04101* (2013.01); *G06F 2203/04102* (2013.01); *G06F 2203/04103* (2013.01); *G06F 2203/04105* (2013.01)

(58) Field of Classification Search
    None
    See application file for complete search history.

(56) References Cited

U.S. PATENT DOCUMENTS

| | | |
|---|---|---|
| 7,158,122 B2 | 1/2007 | Roberts |
| 7,681,432 B2 | 3/2010 | Hay et al. |
| 7,784,366 B2 | 8/2010 | Daverman et al. |
| 8,768,560 B2 | 7/2014 | Willis |
| 9,024,907 B2 | 5/2015 | Bolender |
| 9,075,095 B2 | 7/2015 | Kallassi et al. |
| 9,201,468 B2 | 12/2015 | Schediwy |
| 9,501,195 B1 * | 11/2016 | Kim .................... G02F 1/13338 |
| 2002/0158637 A1 | 10/2002 | Warmack et al. |
| 2007/0229464 A1 | 10/2007 | Hotelling et al. |
| 2007/0236466 A1 | 10/2007 | Hotelling |
| 2010/0253651 A1 | 10/2010 | Day |
| 2011/0227872 A1 | 9/2011 | Huska et al. |
| 2012/0120017 A1 | 5/2012 | Worfolk et al. |
| 2012/0316797 A1 | 12/2012 | Ratzlaff et al. |
| 2012/0319987 A1 | 12/2012 | Woo |
| 2013/0073142 A1 | 3/2013 | Hergesheimer et al. |

(Continued)

*Primary Examiner* — Patrick Moon
(74) *Attorney, Agent, or Firm* — Patterson + Sheridan, LLP (57) ABSTRACT

The input devices described herein include force sensor electrodes that use capacitive sensing to measure the force with which an input object (e.g., a finger or stylus) presses down on the input device. To measure this force, the input device includes a compressible layer disposed between a backlight of a display in the input device and a cover window of the display. In one embodiment, the compressible layer is disposed between the backlight and a transparent thin-film transistor (TFT) layer in the display. In one embodiment, the compressible layer includes an air gap which has a thickness defined by adhesive material disposed on at least two edges of the display.

19 Claims, 7 Drawing Sheets

(56) References Cited

U.S. PATENT DOCUMENTS

| | | |
|---|---|---|
| 2013/0082979 A1 | 4/2013 | Rabu et al. |
| 2014/0002113 A1 | 1/2014 | Schediwy et al. |
| 2014/0085213 A1 | 3/2014 | Huppi et al. |
| 2014/0345358 A1 | 11/2014 | White et al. |
| 2016/0085336 A1* | 3/2016 | Kim ........................ G06F 3/044 345/174 |
| 2016/0259466 A1* | 9/2016 | Gu .......................... G06F 3/044 |
| 2016/0370908 A1* | 12/2016 | Kim ........................ G06F 3/044 |
| 2017/0102809 A1* | 4/2017 | Son ........................ G06F 3/0414 |

* cited by examiner

DETECTING APPLIED FORCES ON A DISPLAY

FIELD OF THE INVENTION

This invention generally relates to electronic devices and performing force sensing.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

BRIEF SUMMARY OF THE INVENTION

One embodiment described herein is an input device that includes a transparent thin-film transistor (TFT) layer, a backlight, a first compressible layer disposed between the TFT layer and the backlight, a plurality of force sensor electrodes, and a processing system configured to acquire a plurality of capacitive measurements using the plurality of force sensor electrodes, the plurality of capacitive measurements affected by compression of the first compressible layer by an input object and determine force measurements of the input object based on the plurality of capacitive measurements.

Another embodiment described herein is a method of operating an input device. The method includes acquiring a plurality of capacitive measurements using a plurality of force sensor electrodes of the input device, wherein the plurality of capacitive measurements are affected by compression of a first compressible layer in the input device, and where the first compressible layer is disposed between a TFT layer and a backlight in the input device. The method includes determining force measurements corresponding to an input object based on the plurality of capacitive measurements.

Another embodiment described herein is a display that includes a liquid crystal material layer, a first layer comprising a plurality of force sensor electrodes, and a TFT layer where the first layer is disposed between the liquid crystal material layer and the TFT layer. The display includes a backlight and a compressible layer disposed between the TFT layer and the backlight where the force sensor electrodes are configured to generate capacitive signals affected by compression of the compressible layer in response to force applied by an input object.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

The following detailed description is merely exemplary in nature and is not intended to limit the disclosure or its application and uses. Furthermore, there is no intention to be bound by any expressed or implied theory presented in the preceding technical field, background, brief summary or the following detailed description.

Various embodiments of the present invention provide input devices and methods that facilitate improved usability. The input devices described herein include force sensor electrodes that use capacitive sensing to measure the force with which an input object (e.g., a finger or stylus) presses down on the input device. To measure this force, the input device includes a compressible layer disposed between a backlight of a display in the input device and a cover window of the display. In one embodiment, the compressible layer is disposed between the backlight and a transparent thin-film transistor (TFT) layer in the display.

In one example, the compressible layer includes an air gap which has a thickness defined by adhesive material (e.g., double-sided tape) disposed on at least two edges of the display. Put differently, the adhesive material defines a separation distance between the backlight and the adjacent layer in the display—e.g., the TFT layer. This separation distance forms the air gap which is compressed when an input object presses down on the cover window. Compressing the air gap changes force measurements acquired using the force sensor electrodes. Based on the changes in the force measurements, the input device can determine the force applied by the input object. In one embodiment, the force sensor electrodes are also used to perform capacitive sensing to detect a location of the input object in a sensing region. That is, the force sensor electrodes may include dual purpose electrodes that are used for both force sensing and identifying a location of the input object in a 2D region or a 3D volume.

In another embodiment, the input device may include two compressible layers. The first compressible layer may be the compressible layer described above that is between the backlight and the cover window while the second compressible layer is on an opposite side of the backlight. That is, the compressible layer may face a first surface of the backlight that is opposite a second side of the backlight facing the second compressible layer. Using two compressible layers may improve the compressibility of the input device and the accuracy of the force measurements.

Figure 1:
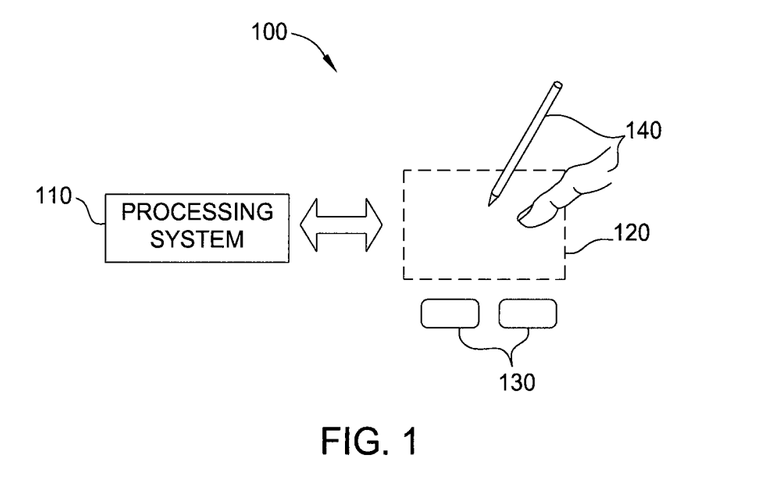
FIG. 1 is a block diagram of an exemplary system that includes an input device in accordance with an embodiment described herein.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object fi. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc. Moreover, the processing system 110 can operate the hardware of the input device 100 to detect force applied by the input object 140. In one embodiment, the sensor electrodes used as force sensor electrodes to detect a location of the input object 140 in the sensing region 120 are also used to detect a force with which the input object 140 presses down on the input device 100 in, for example, the sensing region 120.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
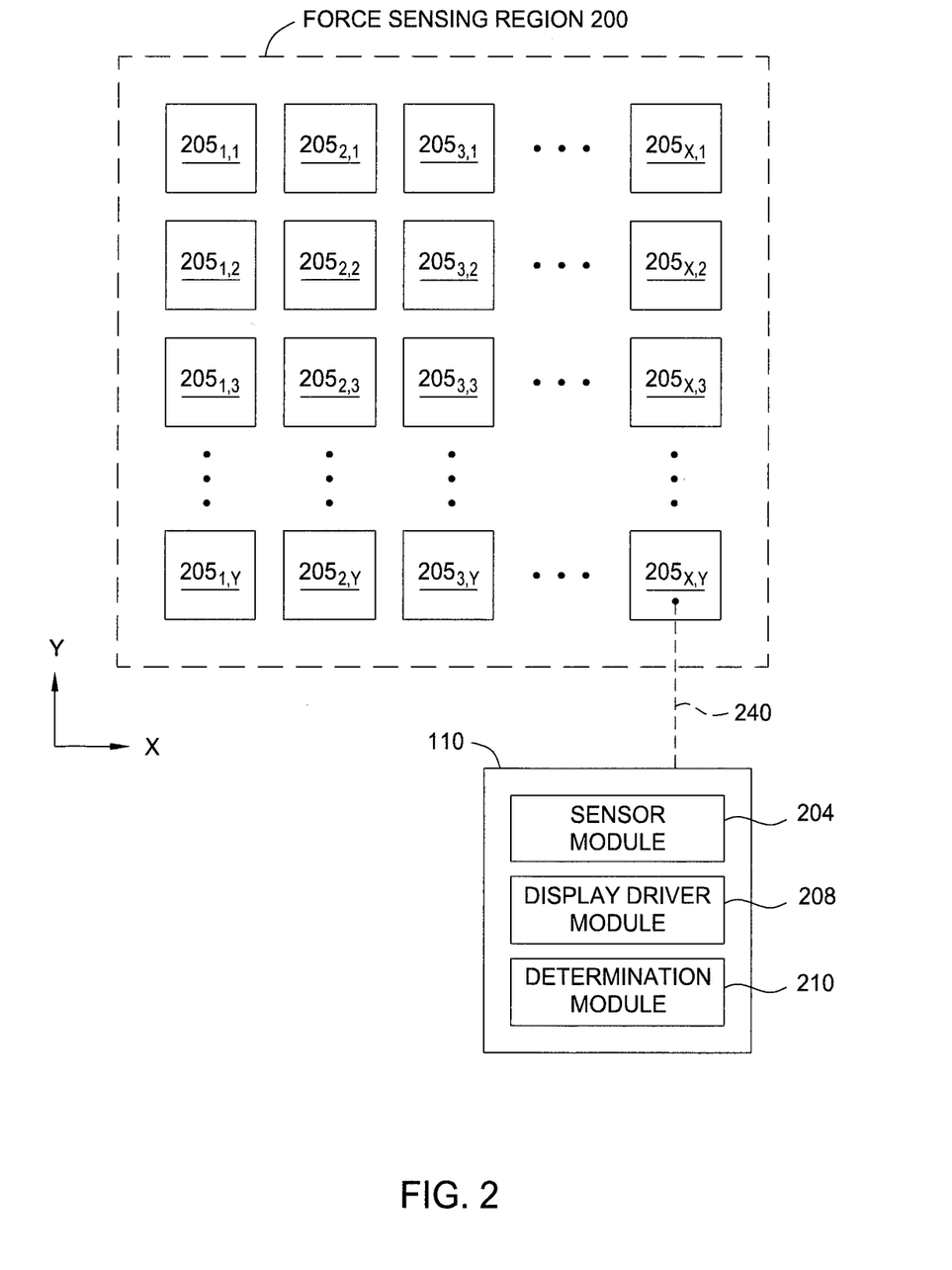
FIG. 2 illustrates portions of exemplary patterns of capacitive sensing pixels in accordance with an embodiment described herein.

FIG. 2 shows a portion of an exemplary pattern of force sensing pixels 205 (also referred to herein as capacitive pixels) in a force sensing region 200, according to some embodiments. Each force sensing pixel 205 may include one of more of the force sensor electrodes mentioned above. For clarity of illustration and description, FIG. 2 presents the regions of the force sensing pixels 205 in a pattern of simple rectangles and does not show various other components within the force sensing pixels 205. In one embodiment, the force sensing pixels 205 are areas of localized capacitance (capacitive coupling). In one embodiment, force sensing pixels 205 may be formed between an individual force sensor electrode and ground. Generally, the capacitive coupling changes depending on the force with which the input object presses on the input device in the force sensing pixels 205.

The exemplary pattern comprises an array of force sensing pixels 205X,Y (referred collectively as pixels 205) arranged in X columns and Y rows in a common plane, wherein X and Y are positive integers, although one of X and Y may be zero. It is contemplated that the pattern of sensing pixels 205 may comprises a plurality of sensing pixels 205 having other configurations, such as polar arrays, repeating patterns, non-repeating patterns, non-uniform arrays a single row or column, or other suitable arrangement. Further, as will be discussed in more detail below, the sensor electrodes in the force sensing pixels 205 may be any shape such as circular, rectangular, diamond, star, square, noncovex, convex, nonconcave concave, etc. As shown here, the force sensing pixels 205 are coupled to the processing system 110.

In one embodiment, at least one force sensor electrode within the force sensing pixels 205 is utilized to determine a force measurement corresponding to an input object via absolute sensing techniques. A sensor module 204 (e.g., a sensor circuit) in processing system 110 is configured to drive a force sensor electrode using a trace 240 in each pixel 205 with a capacitive sensing signal (which can be modulated or unmodulated) and measure a capacitance between the force sensor electrode and the input object (e.g., free space or earth ground) based on the capacitive sensing signal. The processing system 110 includes a determination module (which can be hardware or firmware) which determines the force measurement based on a change in the capacitive coupling between the pixel 205 and ground.

The various electrodes of force sensing pixels 205 are typically ohmically isolated from the electrodes of other pixels 205. Additionally, where a pixel 205 includes multiple electrodes, the electrodes may be ohmically isolated from each other. That is, one or more insulators separate the sensor electrodes and prevent them from electrically shorting to each other.

In one embodiment, the pixels are scanned to determine these capacitive coupling by driving a modulated signal on force sensor electrodes and measuring the absolute capacitance of one or more of the force sensor electrodes. In another embodiment, the force sensor electrodes may be operated such that the modulated signal is driven on a respective force sensor electrode in multiple force sensing pixels 205 at the same time. In such embodiments, an absolute capacitive measurement may be obtained from each of the one or more pixels 205 simultaneously. In one embodiment, the input device 100 simultaneously drives a sensor electrode in a plurality of force sensing pixels 205 and measures an absolute capacitive measurement for each of the pixels 205 in the same sensing cycle. In various embodiments, processing system 110 may be configured to selectively drive and receive with a portion of force sensor electrodes. For example, the force sensor electrodes may be selected based on, but not limited to, an application running on the host processor, a status of the input device, an operating mode of the sensing device and a determined location of an input object. In another embodiment, the input object (e.g., a finger) is the transmitter that is driven with the modulated signal while the force sensor electrode is a receiver.

A set of measurements from the force sensing pixels 205 form a capacitive image (also capacitive frame) representative of the capacitive couplings at the pixels 205. Multiple capacitive images may be acquired over multiple time periods, and differences between them used to derive information about the force applied to the input device.

In some embodiments, one or more of the force sensor electrodes in the pixels 205 include one or more display electrodes used in updating the display of the display screen. In one or more embodiments, the display electrodes comprise one or more segments of a Vcom electrode (common electrodes), a source drive line, gate line, an anode electrode or cathode electrode, or any other display element. These display electrodes may be disposed on an appropriate display screen substrate. For example, the electrodes may be disposed on the a transparent substrate (a glass substrate, TFT glass, a plastic substrate or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, an electrode that is used as both a sensor and a display electrode can also be referred to as a combination electrode, since it performs multiple functions.

Continuing to refer to FIG. 2, the processing system 110 coupled to the sensor electrodes optionally includes a display driver module 208. In one embodiment the sensor module 204 comprises circuitry configured to modulate the force sensor electrodes during periods in which force sensing is desired. The sensor module 204 may be selectively coupled to one or more of the sensor electrodes in the force sensing pixels 205. For example, the sensor module 204 may be coupled to selected portions of the sensor electrodes and operate in either an absolute or transcapacitance sensing mode. In another example, the sensor module 204 may be coupled to different sensor electrodes when operating in the absolute sensing mode than when operating in the transcapacitance sensing mode.

In one embodiment, the sensor module 204 may comprise a receiver module that includes circuitry that drives a modulated signal onto a first sensor electrode in one of the pixels 205 and receives a resulting signal corresponding to the modulated signal to determine changes in absolute capacitance of the sensor electrode. The receiver module may provide a signal including information indicative of the capacitance (e.g., a capacitive measurement) to another module or processor, for example, the determination module 210 or a processor of the electronic device (i.e., a host processor), for determining the force applied by an input object in the force sensing region 200. In one or more embodiments, the receiver module comprises a plurality of receivers, where each receiver may be an analog front ends (AFEs).

In one or more embodiments, force sensing and display updating may occur during at least partially overlapping periods. For example, as a combination electrode is driven for display updating, the combination electrode may also be driven for force sensing. Or overlapping force sensing and display updating may include modulating the reference voltage(s) of the display device and/or modulating at least one display electrode for a display in a time period that at least partially overlaps with when the sensor electrodes are configured for force sensing. In another embodiment, force sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive force sensor electrodes for force sensing during any one or more of or any combination of the different non-display update times.

In one embodiment, the force sensing region 200 may overlap with the capacitive sensing region 120 described in FIG. 1. For example, the force sensor electrodes in the force sensing pixels 205 may be used for dual purposes—i.e., providing capacitive sensing signals for force sensing as well as location sensing to determine a location of the input object in the sensing region 120. In one embodiment, force sensing is performed in non-overlapping time periods when location sensing is performed. For example, the sensor module 204 may perform force sensing by driving the force sensor electrodes using an absolute capacitive technique but perform location sensing by driving the force sensor electrodes using a transcapacitive technique. Alternatively, if the same capacitive sensing technique is used to perform force sensing and location sensing of the input object, then force sensing and location sensing may be performed in overlapping time periods. For example, the same capacitive sensing signals obtained using the force sensor electrodes may be used for both force sensing and location sensing.

Figure 3:
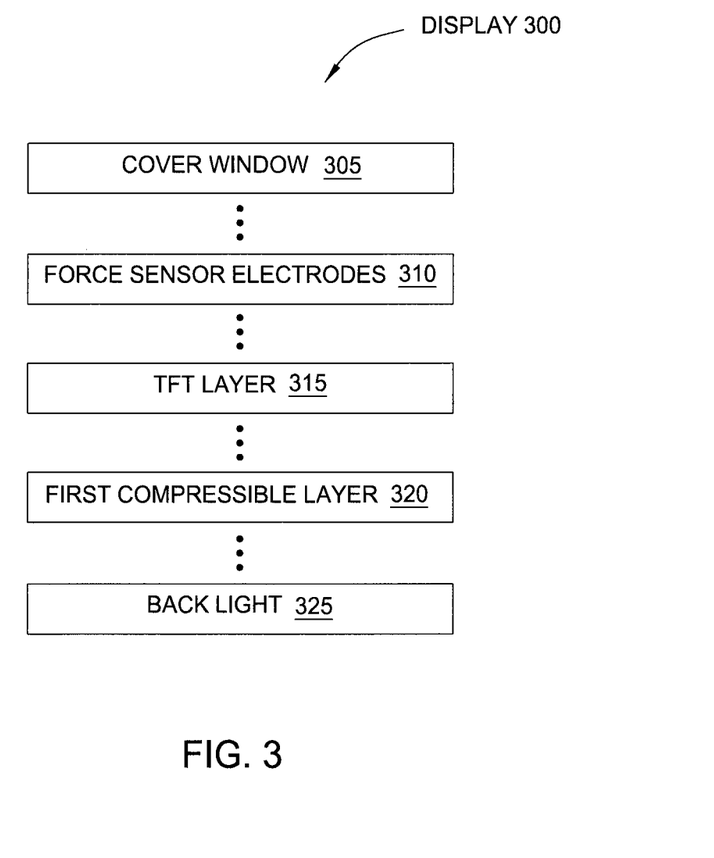
FIG. 3 illustrates a display with a compressible layer between a backlight and force sensor electrodes in accordance with an embodiment described herein.

FIG. 3 illustrates a display 300 with a compressible layer 320 between a backlight 325 and force sensor electrodes 310 in accordance with an embodiment described herein. The display 300 includes a stack of different layers that can be used to output an image to a user. The display 300 may be incorporated into any electronic device to output pictures, video, and the like to the user. In addition to outputting images, the display 300 includes the force sensor electrodes 310 for detecting the amount of force an input object (e.g., a finger or stylus) uses to press down on the display 300. In one embodiment the force sensor electrodes 310 are disposed on a common layer or substrate.

In one embodiment, the cover window 305 provides an interface on which the input object uses to press down on the display 300. Using a capacitive sensing technique (e.g., absolute or transcapacitance sensing), the display 300 uses the force sensor electrodes 310 to generate a force measurement corresponding to the amount of force applied by the input object on the cover window 305. In one embodiment, the force sensor electrodes 310 includes one or more capacitive sensor electrodes also used to perform location sensing to identify a location of the input object on the cover window 305. For example, the cover window 305 can be used to establish both a sensing region 120 as described in FIG. 1 as well as a force sensing region 200 as described in FIG. 2. Furthermore, the force sensor electrodes 310 can also include one or more combination electrodes that are used for both force sensing and display updating (e.g., Vcom).

The display 300 includes a TFT layer 315 that includes transistors for operating source lines, gate lines, routing lines, and the like. Although shown as one layer, there may be multiple TFT layers in the display 300 for display updating and capacitive sensing (whether force sensing or location sensing). In one embodiment, both the force sensor electrodes and TFT layer 315 include transparent material. For example, the transistors and routing lines in the TFT layer 315 and the force sensor electrodes 310 may be made of indium tin oxide (ITO) which is a conductive and transparent material. In this manner, light can pass through the TFT layer 315 and force sensor electrodes 310 and through the cover window 305 (e.g., a transparent plastic or glass material). For example, the backlight 325 provides light that passes through a display material layer (not shown here) which generates the displayed image. Because the TFT layer 315 and force sensor electrodes 310 are transparent, they do not prevent the user from seeing the displayed image.

The display 300 includes a first compressible layer 320 that is between the backlight 325 and the TFT layer 315. While the compressible layer 320 is described below as an air gap that separates the backlight 325 from the other layers in the display 300, the compressible layer 320 could be filled with a compressible transparent material that permits the light emitted by the backlight 325 to pass through the remaining layers in the display 300. In one embodiment, the dimensions and/or material of the compressible layer 320 is selected so that the compressible layer 320 is more compressible relative to the other layers in the display 300—e.g., the cover window 305, force sensor electrodes 310, and TFT layer 315.

When the input object presses down on the cover window 305, this force compresses the first compressible layer 320—e.g., changes the thickness of the air gap. The changed dimensions of the compressible layer 320 alters the capacitive sensing measurements captured using the force sensor electrodes 310. The change in the capacitive sensing measurements resulting from the change in the dimensions of the compressible layer can be correlated to force measurements. That is, the determination module in the processing system can correlate the capacitive sensing measurements to the amount of force used by the input object to press down on the cover window 305.

FIG. 3 is not intended to show all the layers of the display 300. Instead, other layers may be between the illustrated layers. For example, the display 300 may include a polarizer layer or a display material layer (e.g., liquid crystal material) used to form the display pixels. Moreover, the ordering of one or more of the layers may different than the arrangement shown.

Figure 4:
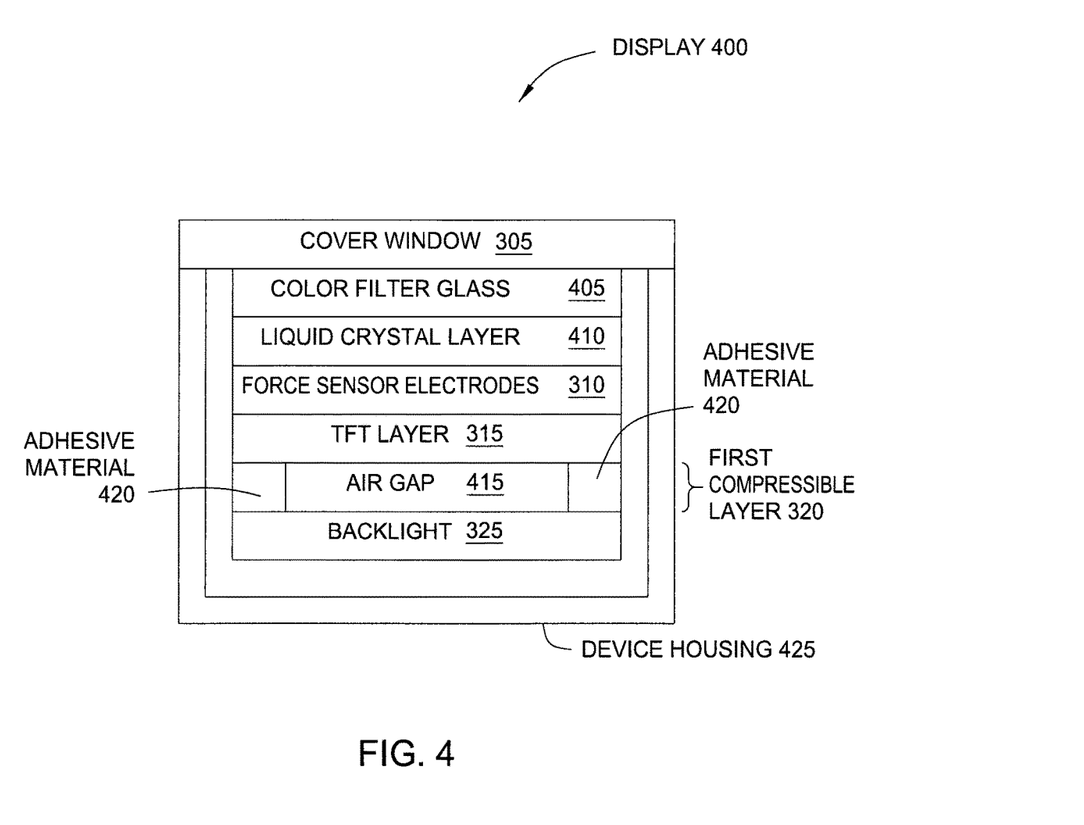
FIG. 4 illustrates a display with a compressible layer between a backlight and force sensor electrodes in accordance with an embodiment described herein.

FIG. 4 illustrates a display 400 with the compressible layer 320 between the backlight 325 and the TFT layer 315 in accordance with an embodiment described herein. The display 400 includes the cover window 305 which provides an interface on which an input object can apply a force to the display 400. In this example, a color filter glass 405 is located below the cover window 305 which filters the light generated by the backlight 325.

The display 400 includes a liquid crystal layer 410 that includes liquid crystal material that forms display pixels (e.g., red, blue, and green pixels) of the display 400. Although liquid crystal material is shown in this embodiment, any type of light emitting diode (LED), liquid crystal display (LCD), plasma, electroluminescence (EL), or other similar display technology with an air gap can be used.

The force sensor electrodes 310 are between the liquid crystal layer 410 and the TFT layer 315. With regards to the compressible layer 320, in the example illustrated by FIG. 4, the compressible layer 320 is directly between the backlight 325 and the TFT layer 315. However, the compressible layer 320 is also between the backlight 325 and the force sensor electrodes 310, liquid crystal layer 410, color filter glass 405, and the cover window 305. In one embodiment, the force sensor electrodes 310 include Vcom electrodes used for driving voltages across the display material in the liquid crystal layer 410 when updating the displayed image. In other embodiments, the force sensor electrodes 310 can be disposed elsewhere in the display 400 but still be between the cover window 305 and the backlight 325.

In this example, the compressible layer 320 includes an air gap 415 whose thickness is defined by adhesive material 420. In one embodiment, the adhesive material 420 is double-sided tape that is disposed along at least two edges of the display 400. The double-sided tape couples the backlight 325 to the TFT layer 315 thereby defining the thickness of the air gap 415. Because the thickness of the adhesive material can be tightly controlled (e.g., within +/−10%), the thickness of the air gap 415 can also be tightly controlled. In one embodiment, the thickness of the adhesive material 420 and air gap 415 is greater than 100 microns but less than 300 microns. In one embodiment the thickness of the adhesive material 420 and air gap 415 is between 150 and 200 microns.

In one example, the thickness of the adhesive material 420 and air gap 415 varies in accordance with the flexibility or thickness of the cover window 305. For example, as the thickness of the cover window 305 increases (i.e., the window 305 becomes less flexible), the thickness of the air gap 415 can be smaller. Conversely, as the thickness of the cover window 305 decreases, the thickness of the air gap 415 may be increased. Put differently, as the flexibility of the cover window 305 decreases, a smaller air gap 415 may be used to provide room for the display 400 to compress in response to an applied force. However, as the flexibility of the cover window 305 increases, a larger air gap 415 may be used to increase the accuracy or range of the force measurements. For example, if the thickness of the air gap 415 is too small for the flexibility of the cover window 305, the bottom surface of the TFT layer 315 may contact the backlight 325 for small forces. Thus, as the input object applies more force, the display 400 cannot compress further which means the force sensor electrodes 310 do not measure a change in capacitance. In such a scenario, the processing system may incorrectly determine that the input object is applying the same amount of force.

A device housing 425 surrounds some or all of the layers in the display 400. As shown by this side view, the device housing 425 surrounds the layers on three sides while the cover window 305 covers the topmost side of the display 400. Although not shown in FIG. 4, the device housing 425 may also cover the front and back sides of the display 400.

In one embodiment, the device housing 425 is electrically grounded when performing force sensing. As such, the device housing 425 may be made from a conductive material (e.g., a metallic material). In another embodiment, at least the bottom surface of the device housing 425 which extends in a direction parallel to the backlight 325 is electrically grounded. If the force sensor electrodes 310 are driven using absolute capacitance, the processing system may determine the capacitance between the electrodes 310 and the grounded device housing 425. As the thickness of the air gap 415 changes in response to a force applied by the input object, the capacitance between the force sensor electrodes 310 and ground also changes. As mentioned above, this change in capacitance can be correlated to a force measurement. When performing display updating or location sensing, the device housing 425 may also be electrically grounded or could be floating. Moreover, the backlight 325 may be electrically floating during location sensing.

In one embodiment, the display 400 may be a unit manufactured by a display manufacturer. That is, instead of the force sensor electrodes 310 being added to a display received from a display manufacture (e.g., disposed on the bottom of the display stack), in this embodiment, the force sensor electrodes 310 are integrated into the display 400 by the manufacture when forming the display 400 (also referred to as an "in-cell" embodiment). Thus, the tuning of the force measurements obtained using the compressible layer 320 and the force sensor electrodes 310 can be performed by the device manufacture before the display 400 is placed in an input device.

Figure 5:
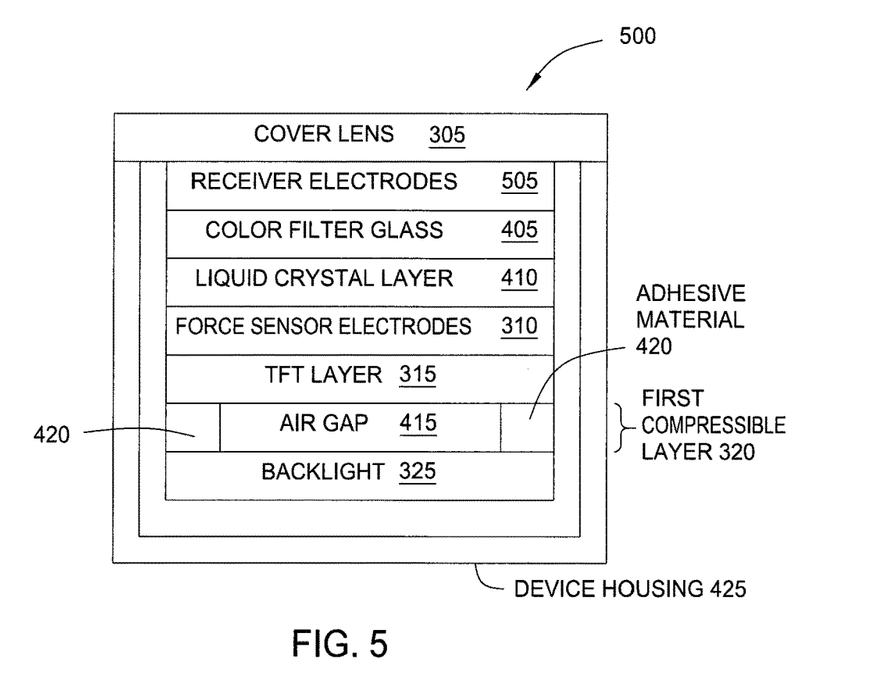
FIG. 5 illustrates a display with a compressible layer between a backlight and force sensor electrodes in accordance with an embodiment described herein.

FIG. 5 illustrates a display 500 with the first compressible layer 320 between the backlight 325 and the TFT layer 315 in accordance with an embodiment described herein. In contrast, to display 400 in FIG. 4, the display 500 includes receiver electrodes 505 which can be used to perform capacitive sensing. In one embodiment, the receiver electrodes 505 are used only for location sensing to identify a location of the input object relative to a sensing region. Put differently, in one embodiment, the receiver electrodes 505 are not used to perform force sensing.

When performing location sensing, the force sensor electrodes 310 includes one or more transmitter electrodes that are driven to perform transcapacitive sensing. The receiver electrodes 505 generate resulting signals which can be measured by the determination module in the processing system to determine a location of the input object in the sensing region. When performing force sensing, the processing system (not shown) uses absolute capacitance to modulate the force sensor electrodes 310 and generate force measurements which can be correlated to a force applied by the input object. In one embodiment, the receiver electrodes 505 are not driven or used during force sensing. In this example, the input device uses transcapacitive sensing implementing the receiver electrodes 505 and force sensor electrodes 310 to perform location sensing but uses absolute capacitive sensing implementing the force sensor electrodes 310 to perform force sensing.

Like in display 400, during force sensing, the capacitive measurements acquired using the force sensor electrodes 310 are altered according to the thickness of the air gap 415. As the force applied to input device compresses the first compressible layer 320, this changes the force measurements which are correlated to an applied force.

Figure 6:
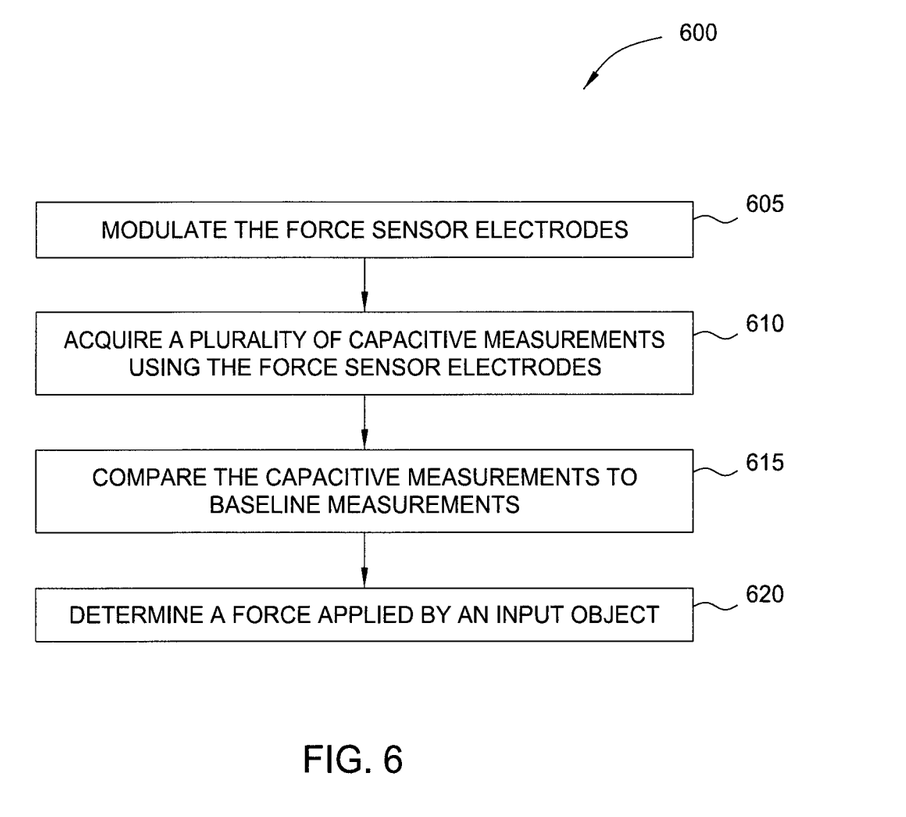
FIG. 6 is a flowchart for determining force using force sensor electrodes in accordance with an embodiment described herein.

FIG. 6 is a flowchart of a method 600 for determining force using force sensor electrodes in accordance with an embodiment described herein. At block 605, the processing system modulates the force sensor electrodes. In one embodiment, a determination module in the processing system modulates the force sensor electrodes using an absolute capacitance technique.

At block 610, the processing system acquires a plurality of capacitive measurements (i.e., force measurements) using the force sensor electrodes. For example, the determination modulate may include one or more AFEs coupled to the force sensor electrodes which include integrators for determining the capacitive coupling between the force sensor electrodes and ground. In one embodiment, the device housing is grounded and the backlight may be electrically floating during force sensing.

As shown above, the input device includes a display with a compressible layer (e.g., an air gap) that is between the backlight in the display and the force sensor electrodes. In one embodiment, the force sensor electrodes are integrated into the display as an in-cell. Further, the compressible layer may be between the backlight and a TFT layer in the display containing the transistors and routing logic for outputting a displayed image.

At block 615, the processing system compares the capacitive measurements (i.e., force measurements) to baseline measurements to determine a change in capacitance. When using absolute capacitance, the processing system determines a change in capacitance between the force sensor electrodes and ground caused by the force applied by the input object. In one embodiment, the baseline measurements are derived when no force is applied to the force sensing region. Thus, by comparing the capacitive force measurements acquired during block 610 to the baseline measurements, the processing system can determine changes in capacitance relative to the baseline.

At block 620, the processing system determines a force applied by the input object. In one embodiment, the processing system can store a mapping for correlating the changes in capacitances to various forces applied by the input object. In another embodiment, the processing system uses one or more thresholds to determine the force applied by the input object. Moreover, the different applied forces can be correlated to different actions. For example, if the change in capacitance exceeds a first threshold, the input device performs a first action, but if the change in capacitance exceeds a second, greater threshold, the input device performs a second action different from the first action. In this manner, the applied forces can be mapped to different actions performed by the input device.

Figure 7:
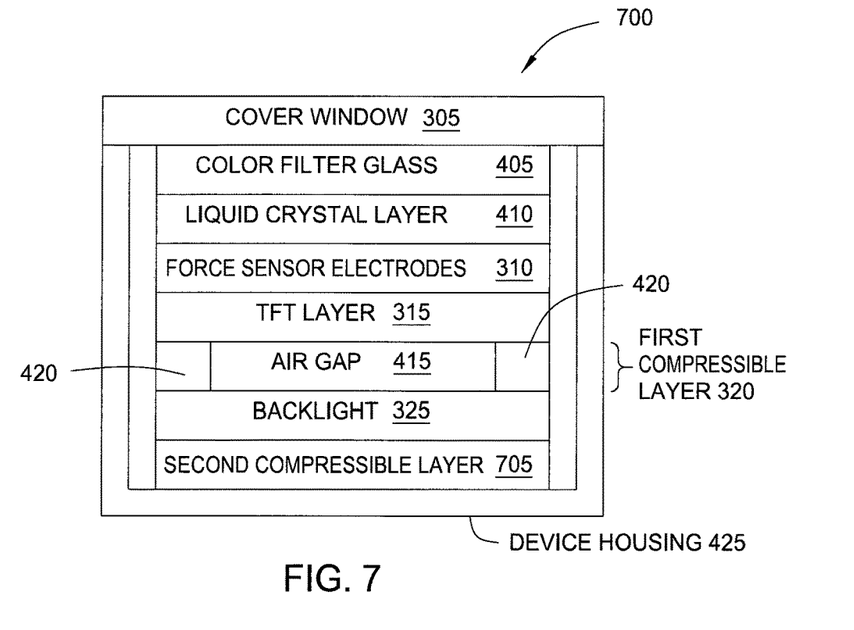
FIG. 7 illustrates a display with two compressible layers for force sensing in accordance with an embodiment described herein.

FIG. 7 illustrates a display 700 with two compressible layers for force sensing in accordance with an embodiment described herein. That is, in this embodiment, the display 700 includes two layers that are compressible by the input object which affects the force measurements acquired during force sensing. As shown, the display 700 includes the first compressible layer 320 described above that has the adhesive material 420 which defines the air gap 415.

In addition, the display 700 includes a second compressible layer 705 disposed underneath the backlight 325. That is, the backlight 325 includes a first surface in a facing relationship with the first compressible layer 320 and a second surface in a facing relationship with the second compressible layer 705. Moreover, the first and second surfaces are on opposite sides of the backlight 325.

In one embodiment, the second compressible layer 705 is an airgap separating the backlight 325 from the device housing 425. Although not shown, the display 700 may include support material around the sides of the second compressible layer 720 for defining the air gap. In another embodiment, the second compressible layer 705 is filled with a solid material such as a compressible foam or rubber. However, unlike the second compressible layer 705, the material in the second compressible layer 705 does not need to be transparent since the second compressible layer 705 is on the other side of the backlight 325. That is, because the light emitted by the backlight 325 does not pass through the second compressible layer 705, any material in the layer 705 does not need to be transparent.

During force sensing, the input object can compress both the first and second compressible layers 320, 705. Compressing one or both of the layers 320, 705 changes the force measurements acquired by the processing system. In this embodiment, the processing system modulates the force sensor electrodes 310 using absolute capacitance to determine the force measurements. As described above, the force measurements can be used to identify changes of capacitances which are mapped to forces applied by the input object. Moreover, when performing location sensing, the processing system again modulates the force sensor electrodes 310 to determine the location of the input object in a sensing region. Thus, in this example, the processing system modulates the force sensor electrodes 310 using absolute capacitance to perform both force sensing and location sensing.

In one embodiment, the thicknesses of both the first and second compressible layers 320, 705 are between 50 and 300 microns. In another embodiment, the thicknesses of both the first and second compressible layers 320, 705 are between 150 and 200 microns. One advantage of having two compressible layers in the display 700 (relative to only one compressible layer) is that display 700 may have reduced settling time such that the dimensions of the display 700 returns to a default state (or uncompressed state) quicker after being compressed by the input object. That is, after a force is applied by the input object (and then removed), because the display 700 includes two compressible layers, the display 700 may return to its default state faster than displays with only one compressible layer—e.g., only the first compressible layer 320.

Figure 8:
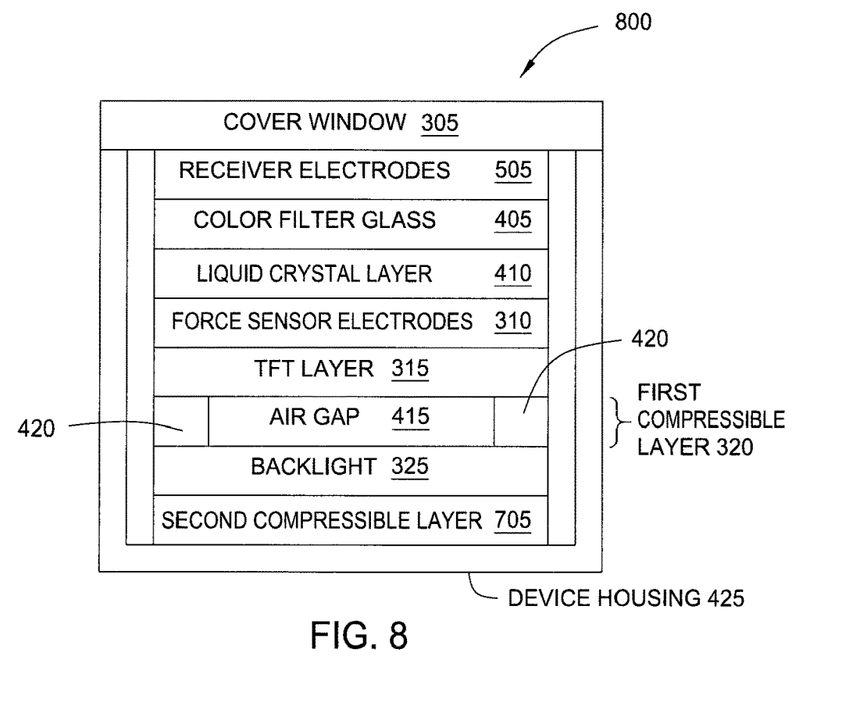
FIG. 8 illustrates a display with two compressible layers for force sensing in accordance with an embodiment described herein.

FIG. 8 illustrates a display 800 with two compressible layers for force sensing in accordance with an embodiment described herein. As shown, display 800 includes the same first and second compressible layers 320, 705 as display 700. However, unlike display 700, display 800 includes receiver electrodes 505 which are used for performing location sensing. For example, during location sensing, the processing system performs transcapacitive sensing using the force sensor electrodes 310 and receiver electrodes 505. In one embodiment, the force sensor electrodes 310 includes one or more transmitter electrodes which, when modulated, generate resulting signals on the receiver electrodes 505 which the determination module uses to determine a location of the input object in the sensing region.

Conversely, when performing force sensing, the force sensor electrodes 310 are used to perform absolute capacitance sensing while the receiver electrodes 505 may not be used. Like in display 700, the force measurements acquired during force sensing depend on the compression of the first and second compressible layers 320, 705. Moreover, the device housing 425 can be grounded when performing force sensing. During location sensing, the device housing 425 may be grounded or electrically floating.

Figure 9:
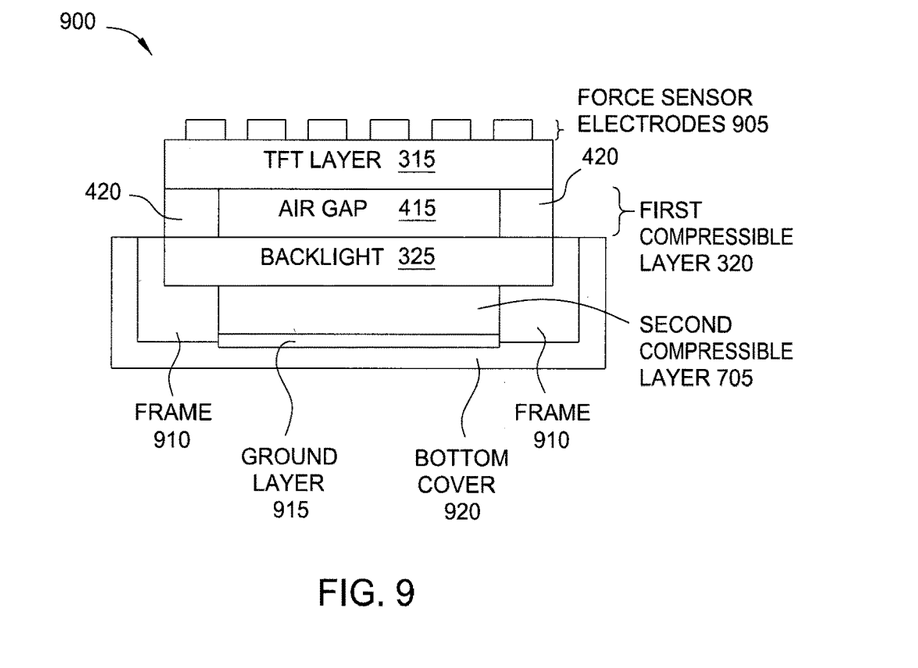
FIG. 9 illustrates a display with two compressible layers for force sensing in accordance with an embodiment described herein.

FIG. 9 illustrates a display 900 with two compressible layers for force sensing in accordance with an embodiment described herein. The display 900 illustrates a side view of force sensor electrodes 905. In one embodiment, the force sensor electrodes 905 are disposed in a matrix array (e.g., a rectangular array) as discussed above to perform absolute capacitance during force sensing. The force sensor electrodes 905 can also be used for location sensing either by themselves or in combination with receiver electrodes (not shown).

The adhesive material 420 defines the air gap 415 that separates the TFT layer 315 on which the force sensor electrodes 905 are disposed from the backlight 325. Moreover, the display 900 includes a frame 910 which supports the backlight 325 and defines an airgap between the backlight 325 and a ground layer 915. In this embodiment, the airgap serves as the second compressible layer 705 which along with the first compressible layer 320 affects the force measurements acquired using the force sensor electrodes 310. During force sensing, the ground layer 915 is electrically grounded while the backlight 325 may be electrically floating.

A bottom cover 920 supports the frame 910 and in one embodiment is part of the device housing. In another embodiment, the bottom cover 920 is coupled to the device housing. The bottom cover 920 and frame 910 can be a plastic, polymer, or metal material that can support the various elements discussed above. However, the bottom cover 920 and frame 910 can be any material that provides sufficient support to establish the first and second compressible layers 320, 705. Moreover, the adhesive material 420, bottom cover 920, and/or frame 910 enable the first and second compressible layers 320, 705 to change from default uncompressed states to respective compressed states and then return to the default states (i.e., the original dimensions) when the force is removed—i.e., when the input object no longer presses on the force sensing region.

The embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

We claim:

1. An input device, comprising:
   a transparent thin-film transistor (TFT) layer;
   a backlight;
   a first compressible layer disposed between the TFT layer and the backlight;
   a plurality of force sensor electrodes disposed on a first side of the first compressible layer, wherein the plurality of force sensor electrodes is disposed between the first compressible layer and a cover window;
   a device housing, wherein a conductive grounding layer forms at least a portion of the device housing, wherein the conductive grounding layer is disposed on a second side of the first compressible layer opposite the first side; and
   a processing system configured to:
      perform absolute capacitive sensing by modulating the plurality of force sensor electrodes to acquire a plurality of capacitive measurements using the plurality of force sensor electrodes when the portion of the device housing that includes the conductive grounding layer is electrically grounded, wherein the plurality of capacitive measurements is affected by compression of the first compressible layer by an input object pressing on the cover window; and
      determine at least one force measurement of the input object based on the plurality of capacitive measurements.

2. The input device of claim 1, wherein the plurality of force sensor electrodes is disposed on a common layer, wherein the first compressible layer is between the common layer and the backlight.

3. The input device of claim 2, wherein the input device comprises:
   a liquid crystal material layer, wherein the common layer is between the liquid crystal material layer and the first compressible layer.

4. The input device of claim 1, wherein the first compressible layer comprises an air gap.

5. The input device of claim 4, wherein a thickness of the air gap is defined by an adhesive material spacing the backlight and the TFT layer.

6. The input device of claim 1 further comprising:
   a second compressible layer disposed between the backlight and the device housing, wherein the second compressible layer faces a first side of the backlight that is opposite of a second side of the backlight facing the first compressible layer.

7. The input device of claim 6, wherein the second compressible layer is thicker than the first compressible layer.

8. The input device of claim 6, wherein the second compressible layer comprises a compressible solid material while the first compressible layer comprises an air gap.

9. The input device of claim 1, wherein the plurality of force sensor electrodes comprise:
   a plurality of capacitive sensor electrodes, wherein the processing system is configured to:

determine a location of the input object in a sensing region using the capacitive sensor electrodes.

10. A method of operating an input device, the method comprising:

performing absolute capacitive sensing by modulating a plurality of force sensor electrodes of the input device to acquire, when grounding a portion of a device housing forming a conductive grounding layer, a plurality of capacitive measurements, wherein the plurality of capacitive measurements is affected by compression of a first compressible layer in the input device when an input object presses on a cover window, wherein the first compressible layer is disposed between a transparent thin-film transistor (TFT) layer and a backlight in the input device, wherein the plurality of force sensor electrodes is disposed between the first compressible layer and the cover window, and wherein the plurality of force sensor electrodes is disposed on a first side of the first compressible layer and the conductive grounding layer is disposed on a second side of the first compressible layer opposite the first side; and determining force measurements corresponding to the input object based on the plurality of capacitive measurements.

11. The method of claim 10, wherein the plurality of force sensor electrodes is disposed on a common layer, wherein the first compressible layer is between the common layer and the backlight.

12. The method of claim 11, wherein the input device comprises:

a liquid crystal material layer, wherein the common layer is between the liquid crystal material layer and the first compressible layer.

13. The method of claim 10, wherein the first compressible layer comprises an air gap.

14. The method of claim 13, wherein a thickness of the air gap is defined by an adhesive material spacing the backlight and the TFT layer.

15. The method of claim 10, wherein the input device comprises:

a second compressible layer disposed between the backlight and the device housing, and wherein the second compressible layer faces a first side of the backlight that is opposite of a second side of the backlight facing the first compressible layer.

16. A display comprising:

a liquid crystal material layer;

a first layer comprising a plurality of force sensor electrodes; and a transparent thin-film transistor (TFT) layer, wherein the first layer is disposed between the liquid crystal material layer and the TFT layer;

a backlight;

a compressible layer disposed between the TFT layer and the backlight, wherein the plurality of force sensor electrodes is disposed on a first side of the compressible layer, and wherein the plurality of force sensor electrodes is disposed between the compressible layer and a cover window; and a device housing, wherein a conductive grounding layer forms at least a portion of the device housing, wherein the conductive grounding layer is disposed on a second side of the compressible layer opposite the first side, wherein, when performing absolute capacitive sensing by modulating the plurality of force sensor electrodes, the plurality of force sensor electrodes is configured to generate capacitive signals affected by compression of the compressible layer in response to force applied by an input object on the cover window while the portion of the device housing that includes the conductive grounding layer is electrically grounded.

17. The display of claim 16, wherein the compressible layer is between the first layer and the backlight, and wherein the compressible layer is between the liquid crystal material layer and the backlight.

18. The display of claim 16, wherein the compressible layer comprises an air gap.

19. The display of claim 18, wherein a thickness of the air gap is defined by an adhesive material spacing the backlight and the TFT layer.

* * * * *